Dec. 20, 1966  B. G. BRAY ETAL  3,292,382
LOW TEMPERATURE SEPARATION OF H₂S FROM HYDROCARBON GAS
Filed Feb. 21, 1964  2 Sheets-Sheet 1

INVENTORS
BRUCE G. BRAY
GEORGE W. SWIFT
BY
ATTORNEY 3,292,382
LOW TEMPERATURE SEPARATION OF H₂S FROM HYDROCARBON GAS
Bruce G. Bray, Ponca City, Okla., and George W. Swift, Lawrence, Kans., assignors to Continental Oil Company, Ponca City, Okla., a corporation of Oklahoma
Filed Feb. 21, 1964, Ser. No. 346,504
2 Claims. (Cl. 62—23)

This invention relates to the sweetening of sour hydrocarbon gases; more particularly it relates to low temperature separation of hydrogen sulfide from admixture with normally gaseous hydrocarbon.

Natural gas and refinery gas are now widely used as sources of energy and as raw materials for petrochemical production. These gases as obtained normally are sour, i.e. contain hydrogen sulfide in objectionable amounts; some carbon dioxide is commonly also present. Hydrogen sulfide presents a pipeline corrosion and an odor problem; strict limitations have been placed on the $H_2S$ content of natural gas which is to be transported by pipelines—not more than 0.25 grain per 100 standard cubic feet of gas. Gas for petrochemical end-use must in many instances be even purer with respect to hydrogen sulfide.

Several processes are known for separating hydrogen sulfide from admixture with normally gaseous hydrocarbons, e.g., the amine process and the hot carbonate process. The present versions of the hot carbonate process are limited to feeds containing relatively small amounts of hydrogen sulfide. The amine process can handle large contents of hydrogen sulfide but the cost of operation increases rapidly with increasing $H_2S$ content.

The hydrogen sulfide recovered can be used as a source of $SO_2/SO_3$ for sulfuric acid manufacture. However, when elemental sulfur is desired, the hydrocarbon content of the hydrogen sulfide feed to catalytic reduction must be below about 5 mole percent. A low hydrocarbon content is also desired for chemical usage of hydrogen sulfide.

Low temperature processing of sour natural gas to separate hydrogen sulfide is known. These processes have complications in the separation operation itself or require after-separation of the hydrogen sulfide stream to decrease the hydrocarbon content.

An object of the invention is a simple process for separating hydrogen sulfide from sour hydrocarbon gas—specifically a low temperature process—containing substantial, and even major, amounts of $H_2S$. Another object is such a low temperature process which produces directly a hydrogen sulfide product of low hydrocarbon content. Other objects will become apparent in the course of the detailed description of the invention.

Briefly, in one process of the invention hydrogen sulfide is separated from a normally gaseous hydrocarbon in a feed gas mixture, such as, a sour natural gas or refinery gas, which feed gas mixture contains at least 5 mole percent of $H_2S$ and is essentially free of water vapor; the feed gas is cooled to a temperature in the range of about $-80°$ F. to about $-120°$ F. at a pressure of at least about 200 p.s.i.a.; the liquid hydrogen sulfide rich phase which is formed is separated from the gaseous hydrocarbon phase, which gaseous phase has a hydrogen sulfide content lower than that of the feed gas.

Briefly, in a second process of the invention hydrogen sulfide is separated from a feed gas mixture containing at least about 5 mole percent of hydrogen sulfide and being essentially free of water vapor. This feed gas, and cycle gas, if any, is cooled to a temperature in the range of about $-80°$ F. and about $-115°$ F. at a substantially constant elevated pressure to obtain a first gaseous hydrocarbon phase having hydrogen sulfide content lower than that of the gas charged and a first liquid hydrogen sulfide phase, which phases are then separated. The first liquid hydrogen sulfide phase is brought to a temperature in the range of about $-50°$ F. and about $-120°$ F. at a pressure of at least about 200 p.s.i.a., said pressure being lower than the pressure in said first cooling operation, to obtain a second liquid hydrogen sulfide phase and a second gaseous hydrocarbon phase. The two gaseous hydrocarbon phases may be combined to form a hydrocarbon product; or the second gaseous hydrocarbon phase may be cycled to said feed gas and the intermingled gas charged to the first cooling operation.

FIRST

Figure 1:
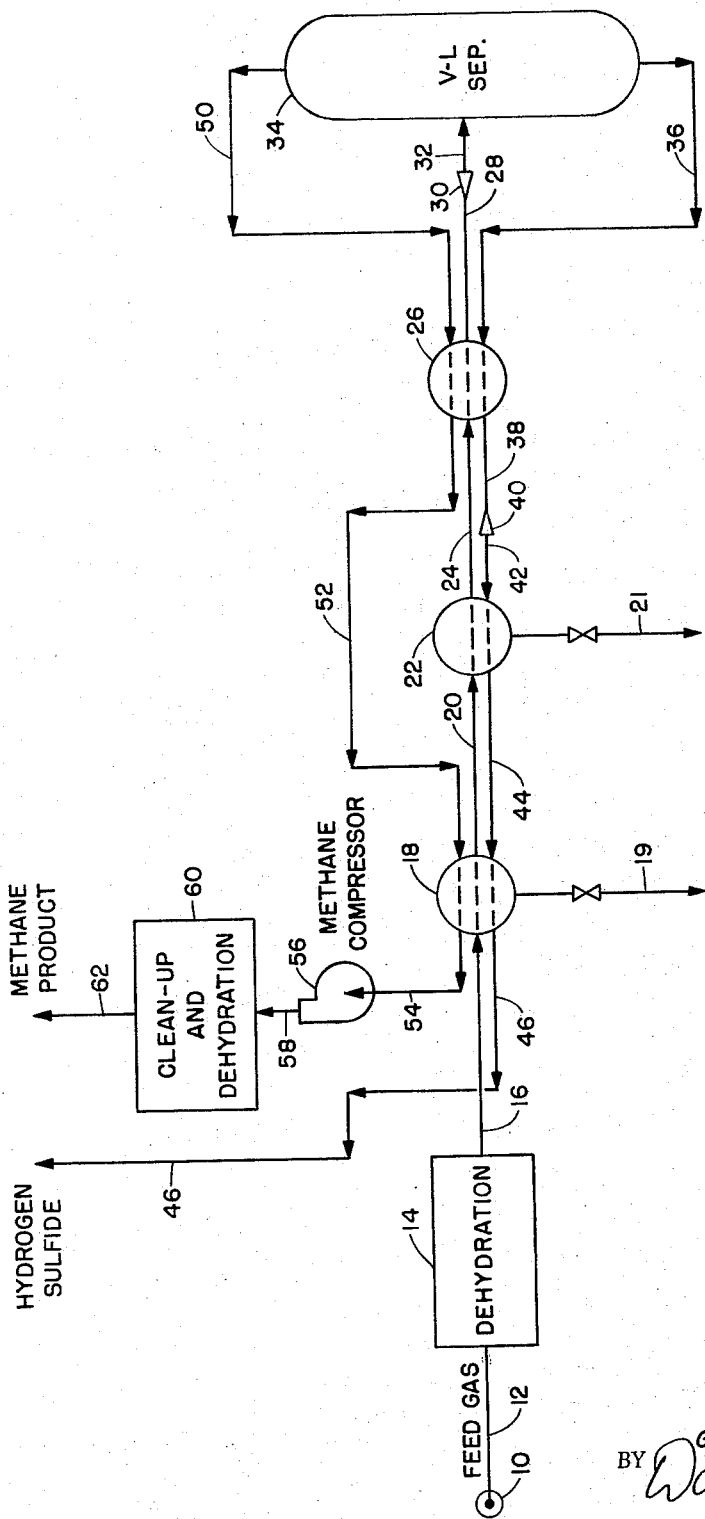
FIGURE 1 shows an embodiment of one process of the invention.

One process of the invention is described in connection with FIGURE 1, which forms a part of this specification. It is to be understood FIGURE 1 is diagrammatic in nature as the individual items of process equipment can be readily compiled and arranged by any one of ordinary skill in this art.

The feed gas is a mixture of hydrogen sulfide and at least one normally gaseous hydrocarbon, usually methane. Pipeline natural gas normally includes methane and ethane hydrocarbons. The as produced natural gas may include methane, ethane, propane and appreciable amounts of butanes and pentanes. In addition to the hydrogen sulfide, carbon dioxide and some nitrogen is frequently present. Refinery gas includes in addition to the saturated hydrocarbons, substantial amounts of unsaturated hydrocarbons. In general refinery fuel gas will have been fractionated to remove the $C_4$ and higher hydrocarbons and substantially all of the $C_3$ hydrocarbons. Normally the feed gas mixture contains methane as the major hydrocarbon consituent.

In this process, the feed gas mixture contains at least about, and preferably above 5 mole percent of hydrogen sulfide. Mixtures containing as much as 90 mole percent of $H_2S$ are known and these may be charged to the process. More commonly, feed gases contain about 5–60 more percent of $H_2S$; the process is particularly adapted for feeds containing above about 10 mole percent, e.g. about 10–60 mole percent of hydrogen sulfide.

In order to avoid clogging of heat exchangers by water freezeout or hydrates it is necessary that the feed gas be essentially free of water; preferably that it have a water dew point below $-100°$ F. which corresponds to less than 1 part per million of water vapor present. In general the water dew point of the feed gas should be about that of the temperature of the cooled feed.

In FIGURE 1, feed gas from source 10 at elevated pressure is passed by way of line 12 to dehydration operation 14 where its water dew point is lowered to about the cooled feed temperature, preferably a dew point of about $-100°$ F. to $-120°$ F.

Dehydrator 14 may be any form of operation which will give the desired dew point, for example a conventional combination of glycol dehydration and solid adsorption or solid adsorption alone.

The dry feed gas is passed in series flow through three heat exchangers by way of line 16, heat exchanger 18, line 20, heat exchanger 22, line 24, and heat exchanger 26. Herein the dry feed gas is cooled by indirect heat exchange with cold gas and/or cold hydrogen sulfide. It is to be understood this arrangement is a matter of economy and other preliminary cooling means may be used.

The pre-cooled dry feed gas is passed from exchanger 26 by way of line 28 including an expansion valve 30 where the gas is expansion cooled to the desired temperature. The cooled discharge from valve 30 is passed by way of line 32 into vapor-liquid separator 34.

When the feed gas includes condensible hydrocarbons such as propane, butane, etc., these condense in the exchangers and may be separated by conventional means and withdrawn by way of valved lines 19 and 21.

It has been discovered that the defined feed gas can be changed into a two phase system consisting of a gaseous hydrocarbon phase having a hydrogen sulfide content lower than that of the feed gas and a liquid hydrogen sulfide rich phase. Dependent to some extent on the composition of the feed gas, at a temperature between about −80° F. and about −120° F. and at a pressure above about (at least about) 200 p.s.i.a. (pounds per square inch absolute)—the particular pressure is related to temperature—the two phase system is obtained. To illustrate for the more common feed gases, the approximate temperature and pressure relationship is 200 p.s.i.a., −120° F.; 600 p.s.i.a., −117° F.; 700 p.s.i.a., −107° F.; 770 p.s.i.a., −100° F. When economic considerations permit, it is advantageous to operate at pressure well above 200 p.s.i.a. The temperature of the cooled feed determines largely the amount of hydrogen sulfide in the gaseous hydrocarbon phase. By proper temperature selection it is possible to have less than 5 mole percent $H_2S$ present in the gaseous hydrocarbon phase.

With a particular feed gas cooling carried out to a temperature in the range of −80° F. to −120° F. and at a pressure of at least about 200 p.s.i.a. to produce a gaseous hydrocarbon phase whose $H_2S$ content is less than that of the feed gas; that is, with a feed gas containing 8 mole percent of $H_2S$, the temperature and pressure would be controlled to give a gaseous hydrocarbon phase containing less than 8 mole percent of $H_2S$ and with a feed gas containing 25 mole percent of $H_2S$, the temperature and pressure would be controlled to give a gaseous hydrocarbon phase containing preferably not more than 10 mole percent of $H_2S$.

With a feed gas containing about 10–60 mole percent, and particularly 10–35 mole percent, of hydrogen sulfide, a gaseous hydrocarbon phase containing less than about 5 mole percent of hydrogen sulfide is readily obtained.

The liquid hydrogen sulfide phase contains some dissolved hydrocarbon. However, under the defined conditions of operation, the hydrocarbon content is low; normally low enough, less than 5 mole percent to eliminate any need for subsequent further removal of hydrocarbon. Normally the liquid hydrogen sulfide phase is a suitable charge to a catalytic reduction operation for the production of elemental sulfur.

In FIGURE 1 a liquid hydrogen sulfide phase, containing some dissolved hydrocarbon, separates in V–L Separator 34 and is withdrawn therefrom by way of line 36. Here, this stream is passed into heat exchanger 26 to help cool the dry feed gas and is then passed through line 38 and expansion valve 40 and line 42 into heat exchanger 22. Usually the liquid $H_2S$ phase is expanded to about the pressure desired for the $H_2S$ product stream. The $H_2S$ phase is now passed by way of line 44 through heat exchanger 18 and passed out of the system by way of line 46, usually at about atmospheric temperature.

A gaseous hydrocarbon phase, containing less $H_2S$ than is in the feed gas, is withdrawn overhead from V–L Separator 34 by way of line 50 and passed through heat exchanger 26. From exchange 26, the gaseous hydrocarbon phase is passed by line 52 to exchanger 18. The gaseous hydrocarbon phase is passed from exchanger 18 by way of line 54 and compressor 56 and line 58 to a $H_2S$ clean-up and dehydration operation 60. Normally the gaseous phase is compressed to pipe line pressure—about 600 p.s.i.a.—but if a low enough pressure gas is needed, the compressor may be eliminated.

The $H_2S$ clean-up operation 60 may be any one which can produce gas having a hydrogen sulfide content suitable for industrial fuel use which is about the specification for pipeline gas, namely 0.24 grain/100 s.c.f. An amine unit or a molecular sieve adsorption unit are illustrative of suitable operations.

The essentially $H_2S$-free gas is passed out of the system by way of line 62.

*Illustration 1*

The operation of this process of the invention is illustrated by a unit charging 200 million s.c.f. of feed gas per stream day. The feed gas is a natural gas containing 10 mole percent of $H_2S$ and the hydrocarbon is substantially only methane. The feed gas is available at 600 p.s.i.a. and 80° F. temperature.

The feed gas is charged to an alumina or molecular sieve dehydration unit and emerges with a water dew point of −100° F.

The dry feed gas is passed in series through heat exchangers 18, 22 and 26 and is cooled in each exchange to the temperatures: Exchanger 18, −31° F.; exchanger 22, −58° F.; exchanger 26, −80° F. The temperature of the cooled feed emerging from expansion valve 30 is −120° F. at a pressure of 200 p.s.i.a.

A liquid hydrogen sulfide phase containing 2.5 mole percent of methane is withdrawn from V–L separator 34 and passed through exchanger 26 and expansion valve 40 to a pressure of 16 p.s.i.a. The gaseous $H_2S$ is then passed through exchangers 22 and 18 and then out of the system at about 16 p.s.i.a. and +65° F.

The gaseous hydrocarbon phase containing 3.2 mole percent of $H_2S$ is withdrawn from V–L separator 34 and passed through exchangers 36 and 18 where it is brought to +65° F. temperature. The gas is raised to pipeline pressure of about 600 p.s.i.a. by compressor 56 and sent to an amine $H_2S$ clean-up unit from which it emerges as pipeline gas with respect to $H_2S$ and water vapor content.

SECOND

This process of the invention is described in connection with FIGURE 2, which forms a part of the specification.

The feed gas here is as defined hereinbefore except that gas contains at least about 4.5 mole percent of hydrogen sulfide.

Figure 2:
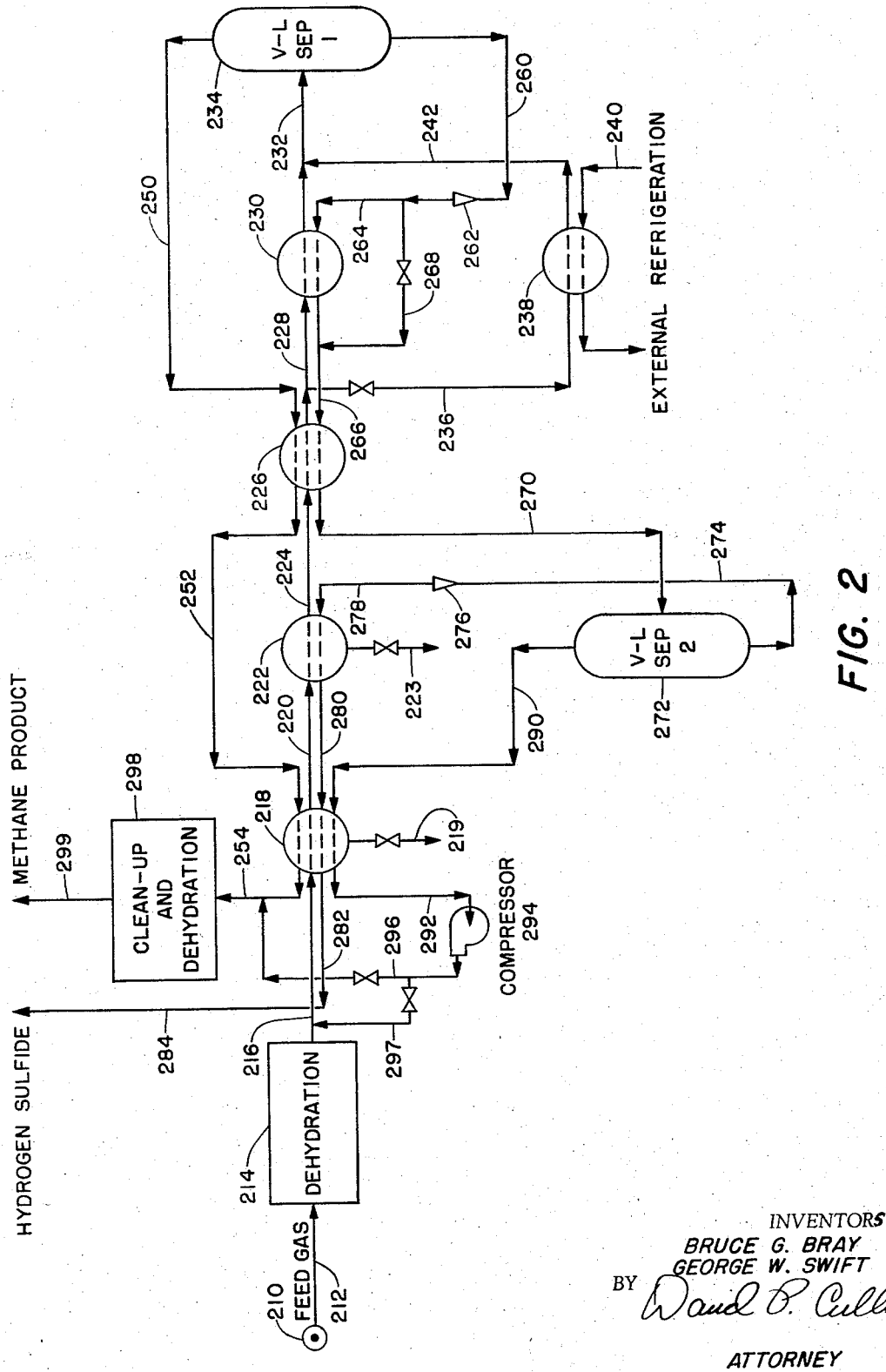
FIGURE 2 shows an embodiment of a second process of the invention.

In FIGURE 2, feed gas at elevated pressure from source 210 is passed by way of line 212 to dehydration unit 214 where its water dew point is lowered to about the cooled feed temperature, preferably a dew point below about −100° F. The dry feed gas, and cycle gas if any, is passed by way of line 216, through heat exchanger 218, line 220, heat exchanger 222, line 224, heat exchanger 226, line 228, heat exchanger 230, line 232 into vapor-liquid separator 234. The pressure in V–L separator 234 is substantially the same as the pressure of feed gas introduced from source 210, i.e. the cooling of the feed gas is carried out at a substantially constant elevated pressure.

When the gas passing through line 216 contains less than about 25 mole percent of hydrogen sulfide, it has been found that additional refrigeration is needed at low temperatures, beyond the refrigeration available by indirect heat exchange of the various cold streams. To provide this additional refrigeration, a portion of the gas in line 228 is passed by way of valved line 236 through heat exchanger 238 where it is cooled by external refrigeration means 240; the cooled side-stream portion is then passed by way of line 242 into line 232 to rejoin the main portion of gas and therein bring the entire stream to the desired temperature.

Any condensible hydrocarbons present in the feed gas may be withdrawn from heat exchangers 218 and 222 by way of valved lines 219 and 223, respectively.

It has been discovered that the defined feed gas can be changed into a two phase system consisting of a gaseous hydrocarbon phase having a hydrogen sulfide content lower than that of the feed gas and a liquid hydrogen sulfide rich phase. When the feed gas contains at least about 5 mole percent of hydrogen sulfide, preferably above that 5 mole percent, the two phase is formed at a temperature in the range of about $-80°$ F. and about $-115°$ F. by operation at a suitable elevated pressure. To illustrate: the approximate temperature and pressure relationship is: 400 p.s.i.a., $-90°$ F.; 600 p.s.i.a., $-114°$ F. The gaseous hydrocarbon phase has a $H_2S$ content lower than the $H_2S$ content of the gas charged to cooling and at a given temperature and pressure condition, the $H_2S$ content is essentially independent of the $H_2S$ content of the gas charged.

With a charged gas containing about 5–60 mole percent of $H_2S$, and particularly about 10–60 mole percent of $H_2S$, it is preferred to cool to a temperature of about $-90°$ F. to about $-115°$ F. It is preferred at this combination of charge gas composition and temperature to operate the substantially constant pressure cooling at a pressure of at least about 500 p.s.i.a.

When the gaseous phase is to be cleaned up by an amine process, it is preferred that the conditions be controlled to produce a sour product gas containing not more than about 10 mole percent of $H_2S$.

A first gaseous hydrocarbon phase containing some $H_2S$ is withdrawn overhead from V–L separator 234 and this is passed through line 250, heat exchanger 226, line 252 and heat exchanger 218 into line 254.

A first liquid hydrogen sulfide phase containing dissolved hydrocarbon is withdrawn from V–L separator 234 and this is passed by way of line 260 and expansion valve 262 where it is expanded to the desired lower temperature and pressure. The expanded stream from valve 262 may be passed entirely by way of line 264 through heat exchanger 230 into line 266. When necessary to control the temperature produced in exchanger 230, a portion of the stream from valve 262 is bypassed by valved line 268 around exchanger 230 and sent directly to line 266. The stream in line 266 is passed through heat exchanger 226 and then by way of line 270 into V–L separator 272.

The cooled first liquid phase in line 270 is at a temperature in the range of about $-50°$ F. and about $-125°$ F. and is at a pressure of at least about 200 p.s.i.a. It is to be understood, the pressure of the cooled first liquid phase entering separator 272 is substantially lower than the pressure of the cooled charge (feed) gas to separator 234. The temperature of the cooled first liquid phase entering separator 272 is determined by the pressure and the desired low hydrocarbon content of the $H_2S$ rich stream withdrawn from separator 272.

Under the defined conditions of temperature and pressure, there exsts in V–L separator 272 a second gaseous phase and a second liquid phase. The second liquid phase is hydrogen sulfide containing some hydrocarbon— under these condtions the second liquid phase is pure enough to be charged to elemental sulfur production or even to many chemical reactions without further removal of hydrocarbons.

The second liquid phase is withdrawn from separator 272 and passed by way of line into expansion valve 276 where it is expanded to the desired pressure. The expanded stream is passed by way of line 278, exchanger 222, line 280, exchanger 218, line 282 and line 284 to storage or disposal.

The second gaseous phase is withdrawn overhead from separator 272 and is passed by way of line 290, exchanger 218, and line 292 to compressor 294, where the stream is raised to the pressure desired for use. This stream may be admixed with the first gaseous phase in line 254, by way of valved line 296, when the combined gas stream will have the desired $H_2S$ content. Or the gas stream from compressor 294 may be cycled in whole or in part by way of valved line 297 to line 216 and admixed with the feed gas from source 210 to become the charge gas stream, previously mentioned. It may be necessary to adjust the pressure of the cycle gas in line 297 prior to entry into line 216.

The gas stream in line 254 is charged to a $H_2S$ cleanup and dehydration unit 298, such as has been earlier described; the product gas of desired low $H_2S$ content is passed to us by way of line 299.

*Illustration 2*

The operation of the second process of the invention is illustrated by a unit charging 20 million s.c.f. of feed gas from source 210 per stream day—527 thousand moles; which feed gas is a natural gas containing 10 mole percent of $H_2S$ and the hydrocarbon is substantially only methane.

The feed gas is dehydrated to a water dew point of $-100°$ F. by passage through alumina unit or molecular sieve unit.

The feed gas is at 600 p.s.i.a.; it is passed through heat exchangers 218, 222, 226 and 230 and a side stream is passed through exchanger 238 and then into V–L separator 234 at substantially 600 p.s.i.a. The feed gas is at 80° F. and emerges from the exchangers at these temperatures: exchanger 218, $-48°$ F.; exchanger 222, $-64°$ F.; exchanger 226, $-90°$ F.; 386 thousand s.c.f. of gas are externally cooled in exchanger 238 and the recombined stream enters separator 234 at $-100°$ F. and 600 p.s.i.a. pressure.

A first gaseous hydrocarbon phase is withdrawn from separator 234 (this gaseous phase contains 4.5 mole percent of $H_2S$) and is passed through exchangers 226 and 18 and on into line 254.

A first liquid hydrogen rich phase, 34 thousand moles is withdrawn from separator 234. This stream contains 10.1 mole percent of dissolved hydrocarbon. After passing through expansion valve 262, the temperature is lowered to $-125°$ F. at 200 p.s.i.a. After heat exchange in exchangers 230 and 226, the stream is passed into V–L separator 272 at $-70°$ F. and substantially 200 p.s.i.a.

There exist in V–L separator 272 a second gaseous hydrocarbon phase having a $H_2S$ content of 13 mole percent. Here this second gaseous phase is withdrawn, compressed to 600 p.s.i.a. by compressor 294 and admixed with the first gaseous hydrocarbon phase to give a combined gas stream having a $H_2S$ content of 4.6 mole percent which is decreased by an amine treating unit to pipeline level of 0.25 grain/100 s.c.f.

The second liquid hydrogen sulfide rich phase contains 1.8 mole percent of hydrocarbon and is passed out of the system at 22 p.s.i.a. and 65° F. and amounts to 30 thousand moles.

Under the above conditions of operation, it has been observed that a feed gas containing about 10–25 mole percent of $H_2S$ produces a product gas stream having 4.6–4.9 mole percent of $H_2S$, i.e. less than 5 mole percent.

Thus having described the invention what is claimed is:
1. A low temperature process for separating hydrogen sulfide from a normally gaseous hydrocarbon which process comprises:
   cooling a feed gas mixture of hydrogen sulfide and at least one normally gaseous hydrocrabon, said mixture containing 5–90 mole percent of hydrogen sulfide and methane gas as the major hydrocrabon constituent and being essentially free of water vapor, to a temperature in the range of about $-80°$ F. and about $-115°$ F., at an elevated pressure substantially the same as that of said feed gas to obtain only a gaseous phase and a liquid phase rich in hydrogen sulfide;
   separating said liquid hydrogen sulfide rich phase containing dissolved hydrocarbon from said gaseous hydrocarbon phase, said gaseous hydrocarbon phase having a hydrogen sulfide content lower than that of said feed gas;

said liquid hydrogen sulfide rich phase is then brought to a temperature in the range of about —50° F. and about —120° F., at a pressure of at least about 200 p.s.i.a., where the pressure of said cooled liquid phase is lower than the pressure of said cooled feed gas;

separating a second liquid hydrogen sulfide phase having a $H_2S$ content greater than that of said liquid phase from a second gaseous hydrocarbon phase and said second gaseous hydrocarbon phase is cycled to feed the gas and the combined charge is then cooled for the first separation.

2. The process of claim 1 wherein said feed gas has a water dew point below about —100° F.

References Cited by the Examiner

UNITED STATES PATENTS 2,901,326  8/1959  Kuratta et al. _____ 62—12 X
3,224,208  12/1965  Schulumberger et al. ____ 62—12

FOREIGN PATENTS 659,432  3/1963  Canada.

NORMAN YUDKOFF, *Primary Examiner.*

V. W. PRETKA, *Assistant Examiner.*